(12) United States Patent
Dunaevsky et al.

(10) Patent No.: US 6,935,220 B2
(45) Date of Patent: Aug. 30, 2005

(54) CONTOURED PISTON

(75) Inventors: Valery V. Dunaevsky, Fairview Park, OH (US); Susumu Ariga, San Antonio, TX (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 96 days.

(21) Appl. No.: 10/448,892

(22) Filed: May 30, 2003

(65) Prior Publication Data

US 2004/0237775 A1 Dec. 2, 2004

(51) Int. Cl.$^7$ ................................................ F01B 31/10
(52) U.S. Cl. .......................................... 92/159; 92/160
(58) Field of Search ................................. 92/159, 160

(56) References Cited

U.S. PATENT DOCUMENTS

| | | | |
|---|---|---|---|
| 1,465,647 A | * 8/1923 | Ludlam | 92/160 |
| 1,473,127 A | * 11/1923 | Short | 92/160 |
| 4,809,591 A | * 3/1989 | Rhodes et al. | 92/159 |
| 5,035,210 A | 7/1991 | Arai et al. | |
| 5,123,386 A | 6/1992 | Wakita et al. | |
| 5,201,805 A | * 4/1993 | Schubert | 92/160 |
| 5,331,932 A | * 7/1994 | Watanabe et al. | 92/239 |
| 5,737,999 A | 4/1998 | Ariga | |
| 5,839,351 A | 11/1998 | Nakada | |
| 6,378,482 B2 | 4/2002 | Marcil | |

OTHER PUBLICATIONS

"A study of oil–film thickness for reducing oil comsuption in a reciprocating air–brake compressor" by Dunaevsky, et al, *Lubrication and Sealing Oils*, C591/013/2001 pp 423–437.

* cited by examiner

*Primary Examiner*—F. Daniel Lopez
(74) *Attorney, Agent, or Firm*—Calfee, Halter & Griswold LLP

(57) ABSTRACT

A piston for use in internal combustion engines or reciprocating compressors such as those utilized in air-brake systems for heavy duty freight vehicles. The body of the piston of the present invention is contoured in manner to reduce the undesirable build-up of oil pressure that frequently occurs at the oil control ring or rings when the piston is in operation. The crown portion of the piston body includes a series of piston ring groove and piston ring lands, one of which is modified to include drainage notches. The skirt portion of the piston body includes a plurality of furrows near the face of the piston, a horizontal channel recessed into the surface of the piston skirt, and a horizontal groove formed in the outer skirt wall of the piston. These structures function individually and in combination to provide multiple means by which excess lubricating oil may be directed away from the oil control rings and back toward the crankcase or oil reservoir within the engine or compressor.

10 Claims, 4 Drawing Sheets

CONTOURED PISTON

TECHNICAL FIELD OF THE INVENTION

The present invention relates generally to pistons designed for use in reciprocating compressors and internal combustion engines, and specifically to pistons designed to reduce the oil pressure experienced by piston oil rings when the piston is in operation.

BACKGROUND OF THE INVENTION

A typical four-stoke internal combustion engine involves four piston strokes. The first stroke is the intake or suction stroke in which the piston moves down the cylinder and creates a partial vacuum in the cylinder. Intake air alone, or a mixture of air and fuel, is forced though the inlet valve into the cylinder by atmospheric pressure which is now greater than the pressure in the cylinder. During this stroke, the exhaust valve stays closed. The second stroke is the compression stroke wherein the piston moves up in the cylinder with both valves closed. The intake air or air and fuel mixture is compressed and the pressure inside the cylinder rises. The third stroke is the power stroke. Near the end of the compression stroke, the air and fuel mixture is ignited by an electric spark from the spark plug in the case of a spark-ignition engine. In a compression-ignition engine, fuel directly injected into the cylinder mixes with the compressed air and ignites spontaneously. The combustion that results causes the temperature within the cylinder to rise and creates enough pressure to force the piston down again. On the fourth stroke, or exhaust stroke, the piston moves up again and forces the burned gases out of the cylinder and into the exhaust system. This cycle repeats itself the entire time the engine is running.

In an internal combustion engine, the engine oil is contained in the sump or crankcase. The oil pump draws the oil from the crankcase, forces it through a filter and then circulates the oil through passages drilled in the engine block to bearings, the valve mechanism, and the pistons and cylinder walls before returning to the crankcase. During its circulation through the engine, the oil serves to lubricate parts, keep the engine free of rust and deposits, cool hot internal surfaces, and seal the piston rings and valves against leakage of combustion gases.

In any engine oil, the detergent-dispersant, anti-wear, oxidation, and rust and corrosion additives eventually become depleted and the oil loses much of its ability to prevent deposits from accumulating on critical engine parts. Among the critical engine components affected by improperly maintained oil are the piston rings and the piston itself.

Piston rings are typically spring-loaded for a tight fit against walls of the engine's cylinders; the compression rings prevent the escape of combustion gases into the crankcase and help maintain combustion chamber pressure while the oil control ring restricts oil movement from the crankcase past the piston body. Hard, baked-on deposits formed from the contaminants in the oil may cause the rings to stick and lose their sealing ability, thereby allowing the oil to leak past the rings into the combustion chamber where it is burned. Combustion of the engine's oil in this manner results in rapid oil deterioration, increased oil consumption, and is a source of contaminants that can reduce the effectiveness of the car's emission control devices. Additionally, stuck piston rings cause a loss of power and allow combustion products ("blow-by") to enter the crankcase, further contaminating the oil and accelerating its deterioration.

In addition to contaminants in the oil, recent studies of the oil film thickness of the piston rings in certain reciprocating compressors (see IMechE 2001 C591/013/20021) have suggested that a major factor negatively affecting oil consumption is insufficient or inadequate oil drainage by the piston itself. The accumulation of excessive hydrodynamic pressure at the piston rings can force the rings into the grooves in an undesirable manner, thereby permitting an excessive amount of oil to pass through the rings' running faces. This excess oil is then forced into the combustion chamber where it is burned. Thus, there is a need for a piston that effectively drains the oil needed to lubricate the piston within the cylinder away from the piston rings and back to the crankcase portion of the engine or reciprocating compressor. Such a piston should significantly reduce the pressure build-up at the piston rings, thereby extending the life of the oil, piston rings, and engine or compressor.

SUMMARY OF THE INVENTION

These and other limitations of the prior art are overcome by the present invention which provides a piston for use in (i) compressors, including air-brake compressors used with heavy duty freight vehicles such as trucks and buses, and (ii) internal combustion engines such as those used in a wide variety of motor vehicles. In the most generic sense, the present invention comprises a piston having a contoured body that includes a variety of features that effectively reduce the oil pressure that typically builds just below the oil control ring when the piston is in operation. More specifically, this piston includes drainage notches, drainage furrows, drainage bores, channels and groove(s). These features function separately or together to reduce any excessive oil pressure by directing the oil away from the piston rings and back toward the crankcase of the engine or compressor.

The exemplary embodiment of the present invention comprises a piston that includes both a piston crown and a contoured piston skirt beneath the piston crown. The piston crown further includes (i) a plurality of piston ring grooves for accommodating a series of piston rings; and (ii) a plurality of piston ring lands situated between the piston ring grooves. Preferably, the piston ring groove closest to the piston skirt further comprises a plurality of drainage bores passing through the body of the piston. Additionally, on either side of the piston body, the piston ring land closest to the piston skirt includes at least two drainage notches for draining oil that has migrated behind the piston rings away from the piston rings and onto drainage furrows cut into the piston body.

The piston skirt further includes (i) at least two piston pin apertures positioned opposite one another on the piston body; (ii) an outer skirt wall comprising two separate sections positioned on opposite sides of the piston in the regions of the piston between the piston pin apertures; and (iii) a recessed surface area or channel cut into the piston body for directing the oil away from the piston ring lands and back toward the crankcase. Preferably, the outer skirt wall further includes at least one groove cut into the outer skirt wall and running parallel to the piston ring lands for draining lubricating oil away from the piston rings.

Further advantages of the present invention will become apparent to those of ordinary skill in the art upon reading and understanding the following detailed description of the preferred embodiments.

BRIEF DESCRIPTION OF THE DRAWINGS

The accompanying drawings, which are incorporated into and form a part of the specification, illustrate an exemplary embodiment of the invention and, together with the general description given above and detailed description of the preferred embodiments given below, serve to explain the principles of the invention.

DETAILED DESCRIPTION OF THE INVENTION

Figure 1:
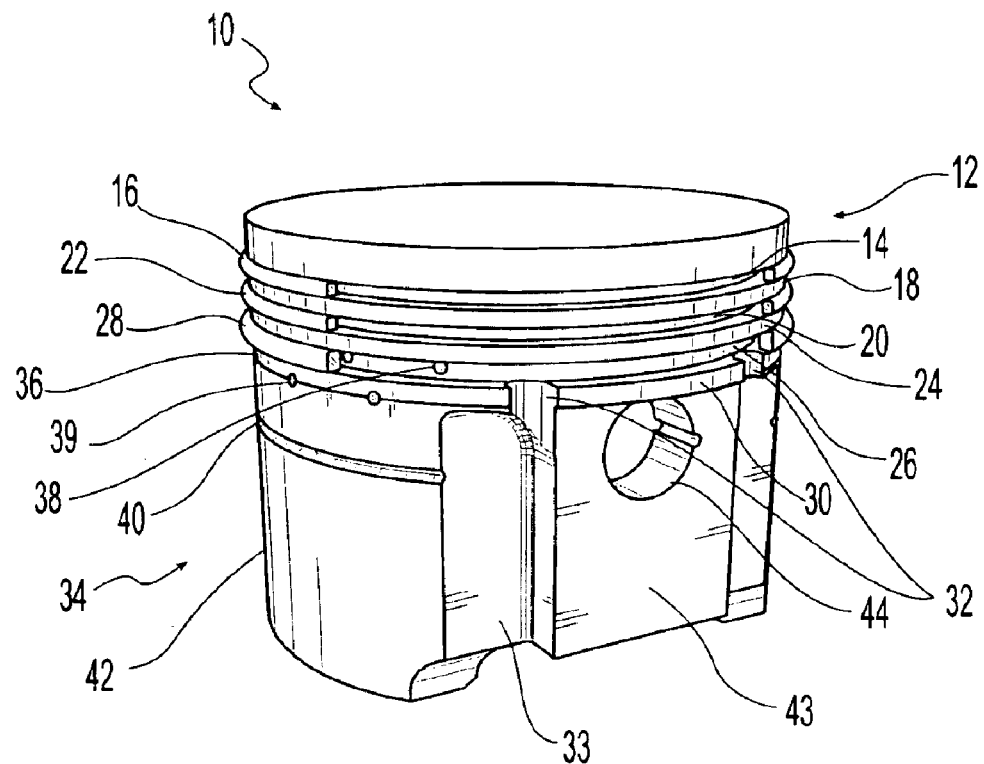
FIG. 1 is a perspective view of the piston of the present invention showing the piston crown and contoured piston skirt.

Reference Numerals
10 piston body
12 piston crown
14 first piston ring groove
16 first piston ring (1st compression ring)
18 first piston ring land
20 second piston ring groove
22 second piston ring (2nd compression ring)
24 second piston ring land
26 third piston ring groove
28 third piston ring (oil control ring)
30 third piston ring land
32 drainage notches
33 drainage furrows
34 piston skirt
36 channel (recessed surface area)
38 first plurality of drainage bores
39 second plurality of drainage bores
40 groove
42 outer skirt wall
43 piston face
44 piston pin aperture
46 piston pin bore
48 piston pin
50 connecting rod
52 crankshaft
54 crankcase
55 oil
56 oil pan
58 sump
60 engine block
62 cylinder
64 combustion/compression chamber With reference to the Figures, an exemplary embodiment of the present invention provides a piston for use in compressors or in engines that includes features for reducing the hydrodynamic pressure experienced by certain piston components when the piston is in operation. In general, the present invention overcomes the problems created by excessive oil pressure build-up at the oil control rings and on the piston skirt by providing a number of features, including (i) drainage notches, (ii) drainage furrows, (iii) drainage bores, (iv) channel(s), and (v) groove(s). If lubricating oil begins to accumulate beneath and/or behind the piston rings, these various features function separately or together to reduce any resulting excessive oil pressure by directing the oil away from the piston rings and back toward the crankcase.

Figure 5:
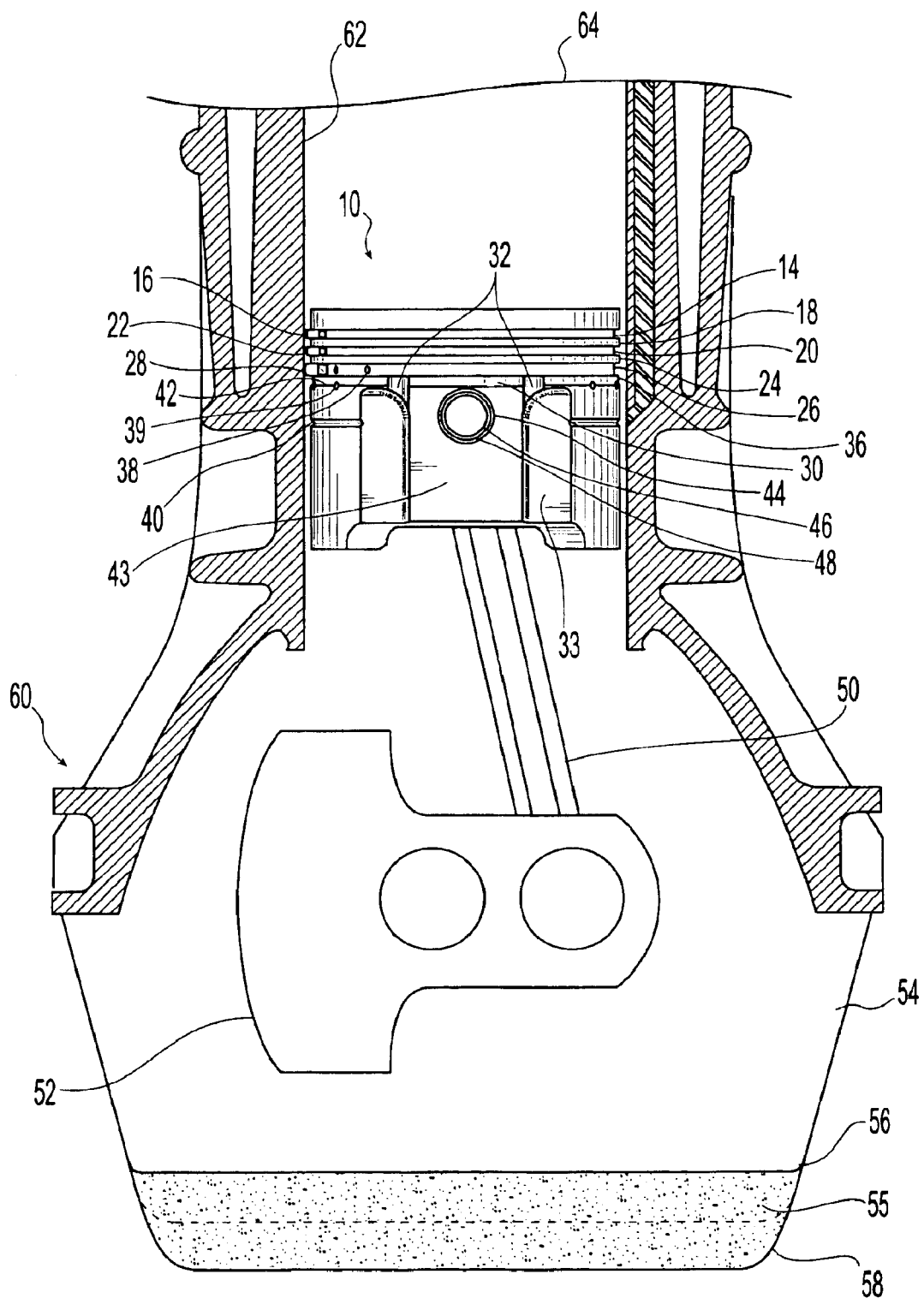
FIG. 5 is a cross sectional view of the piston of FIG. 1 mounted inside the cylinder of an internal combustion engine.

As shown in FIG. 1, piston body 10 includes a piston crown 12 and a contoured piston skirt 34. Piston crown 12 further includes a series of piston rings, piston grooves, and piston lands situated between the piston rings. More specifically, as best shown in FIGS. 1 and 5, piston crown 12 includes a first piston ring groove 14, a first piston ring 16 and a first piston ring land 18. This first piston ring 16 comprises what is commonly referred to as the first compression ring" which is the topmost piston ring that, in combination with the second compression ring, maintains the compression of combustible gases within cylinder 62 during the compression stroke and prevents the products of combustion from blowing by piston body 10 into crankcase 54 during the power stroke.

Figure 4:
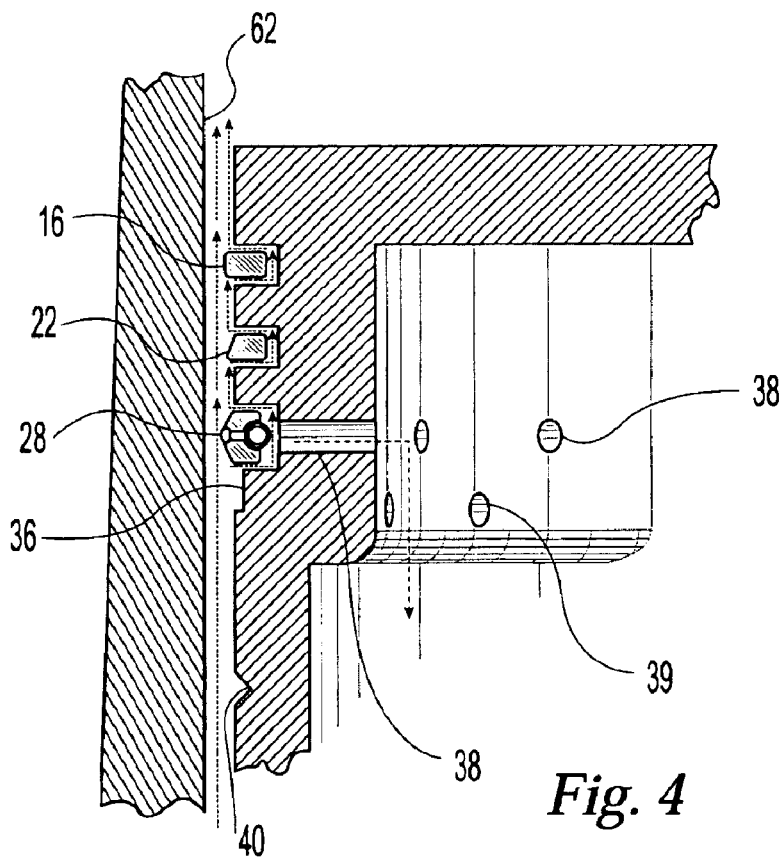
FIG. 4 is a detail of the piston body showing the piston rings of the piston of FIG. 1 in relation to the cylinder wall of an engine or compressor.

Piston crown 12 also includes second piston ring groove 20, second piston ring 22, and second piston ring land 24. Second piston ring 22 functions as the second compression ring. Piston crown 12 further comprises third piston ring groove 26, third piston ring 28, and third piston ring land 30 which is formed in the piston body immediately above piston face 43. The third, lowermost piston ring functions as the "oil control ring" and prevents an excessive amount of lubricating oil from being supplied to the compression rings where it would be drawn up into combustion chamber 64 during the intake or suction stroke. As will be appreciated by those skilled in the art, piston ring 28, shown in cross-section in FIG. 4, is the type of commercially available piston ring commonly used as the oil control ring. Such oil control rings typically include structural features that act as "valves" that control the amount of oil supplied to the compression rings and that assist in returning oil to the crankcase.

In the exemplary embodiment shown in FIG. 1, third piston ring land 30 is positioned between two drainage notches 32. Preferably, these drainage notches 32 are present on opposite sides of the piston body immediately adjacent to third piston ring land 30. These drainage notches 32 allow lubricating oil that has migrated to the space between third piston ring groove 26 and third piston ring 28 on both the thrust and anti-thrust sides of the piston to drain downward onto drainage furrows 33 and away from third piston ring groove 26. These drainage furrows 33 are formed on opposite sides of said piston body adjacent to and on each side of piston face 43. Oil that has migrated behind the oil control ring can be drained through the drainage notches even when the oil control ring is sitting on the bottom groove in the piston crown, i.e., third piston ring groove 26. Third piston ring groove 26 also includes a plurality of drainage bores 39 that pass completely through the material of the piston body and provide an additional route for lubricating oil to drain out of piston ring groove 26 and flow away from the piston rings (see downward arrow in FIG. 4). Drainage bores 39 are shown in cross section in FIG. 4, which also illustrates the position of the piston rings in relation to the inner wall of cylinder 62.

Preferably, the piston of the exemplary embodiment is substantially cylindrical in shape, and substantially circular in cross-section. However, as best shown in FIGS. 1 and 5, piston body 10 includes piston face 43 which typically includes a flattened area around piston pin aperture 44, and contoured piston skirt 34 which includes additional means for directing lubricating oil away from the oil control rings, namely channel 36 and groove 40.

Figure 2:
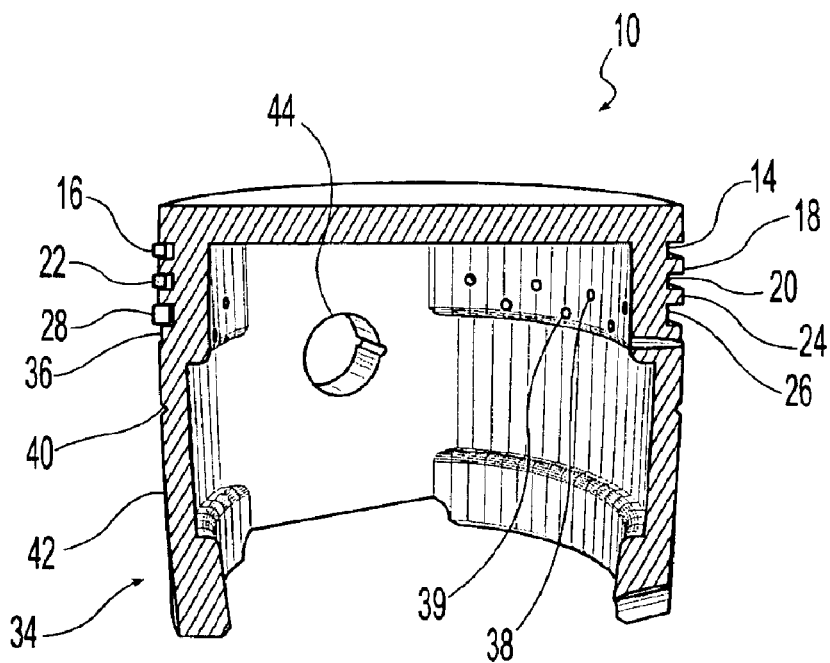
FIG. 2 is a cross-sectional perspective view of the piston of FIG. 1 detailing the interior structure of the piston body.
Figure 3:
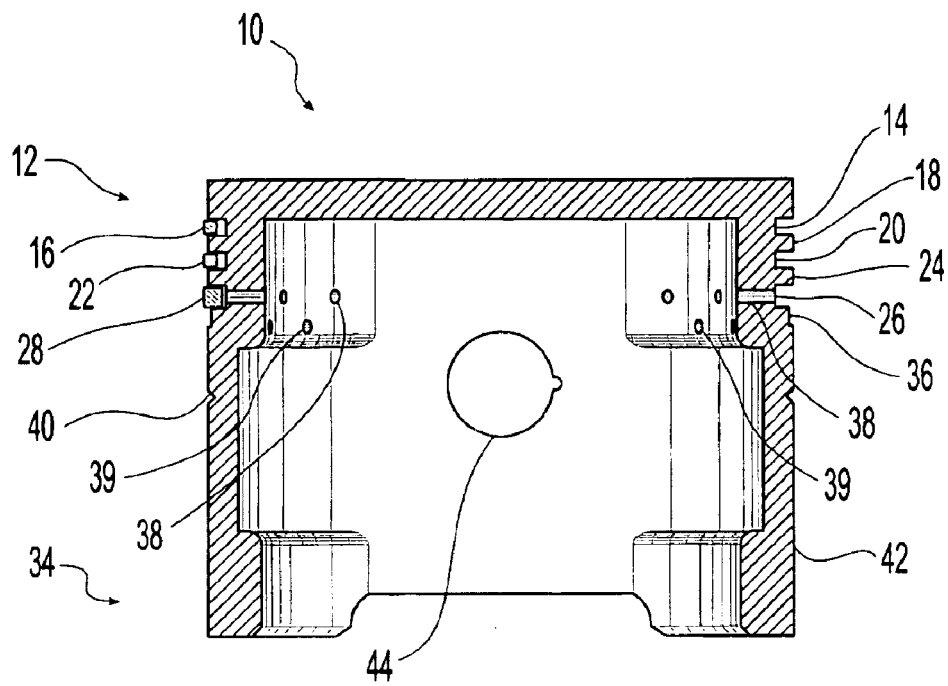
FIG. 3 is a cross-sectional view of the piston of FIG. 1 detailing the interior structure of the piston body.

The exemplary embodiment of piston skirt 34 shown in FIG. 1 includes a recessed surface area in the form of a channel 36 and an outer skirt wall 42. On the two sides of the piston body that do not include third piston ring land 30 and piston face 43, channel 36 is recessed into piston skirt 34 just beneath third piston ring groove 26 and extends around each side of the piston body beginning at one drainage notch 32 and ending at the corresponding drainage notch 32 on the opposite side of the piston body. Lubricating oil that has accumulated beneath and/or behind third piston ring 28, flows into channel 36 and is directed toward notches 32 and eventually onto drainage furrows 33. Channel 36 also includes a plurality of drainage bores 38 that pass completely through the material of the piston body for draining excess lubricating oil away from the piston rings. These drainage bores 38 pass through a portion of both channel 36 and outer skirt wall 42 and are shown in cross-section in FIG. 2 (in perspective), FIG. 3 and FIG. 4.

With reference generally to FIGS. 1–5, the exemplary embodiment of this invention includes a groove 40 that has been cut into outer skirt wall 42 on both sides of piston body 10. Groove 40 provides a means by which excess lubricating oil can be directed across the piston skirt, away from the piston rings, onto drainage furrows 33 and back toward the crankcase or other oil reservoir within the engine or compressor. As shown in the Figures, groove 40 typically runs parallel to the piston rings and is located just above the half-way point between the bottom edge of outer skirt wall 42 and the bottom edge of channel 36. FIG. 4 illustrates the placement of groove 40 in relation to the inner wall of cylinder 62. Preferably, groove 40 is substantially V-shaped, although other geometries are possible such as, for example, a U-shaped groove.

FIG. 5 shows the piston of the present invention mounted within the engine block 60 of an internal combustion engine. As stated, the design of the piston allows it to be installed in both compressors and internal combustion engines. With reference to FIG. 5, when the piston of the present invention is in operation, lubricating oil 55 is typically provided to the cylinder from oil sump 58 by the engine's oil pump. Due to the substantially circular cross-section of piston body 10, oil supplied to the piston can only flow upward to the oil control ring when the piston down-strokes within cylinder 62. Thus, during the positive acceleration period (i.e., the compression stroke and the power stroke), oil between piston skirt 34 and the cylinder wall is forced up against the oil control ring due to the inertial force of the piston. The piston squeezes oil on either the thrust or anti-thrust side depending on the secondary motion of the piston. As previously stated, significant oil pressure typically builds up below the oil control ring. In the absence of the pressure reducing features of the present invention, this buildup of oil pressure results in lubricating oil being forced past the oil control ring and upward toward the compression rings and the combustion chamber (see upward arrows in FIG. 4). If this oil passes the compression rings and enters combustion chamber 64, the oil combusts, thereby creating the problems described above.

As described, the exemplary embodiment of the present invention overcomes the problems created by excessive oil pressure build-up at the oil control rings and on the piston skirt by providing a number of features, including (i) drainage notches 32; (ii) drainage furrows 33; (iii) drainage bores 38 and 39; (iv) channel(s) 36; and (v) groove(s) 40. If lubricating oil begins to accumulate beneath and/or behind third piston ring 28, these various features function separately or together to reduce any resulting excessive oil pressure by directing the oil away from the piston rings and back toward crankcase 54. Other embodiments of the present invention include alternate sub-combinations these described features, and do not necessarily include each of the described pressure-reducing means.

As described, the design of the exemplary embodiment of this invention provides multiple means by which excessive lubricating oil can be diverted away from the oil control rings and redirected toward portions of the piston body that have been modified to increase the space between the piston and the cylinder wall, thereby encouraging the oil to drain downward and away from the piston itself or, alternately, toward the piston pin aperture. Pistons are typically designed to be attached to one end of a connecting rod by a piston pin. The other end of the connecting rod is typically attached to the engine's crankshaft. The piston pin typically includes a cap on both ends to maintain the pin position on the piston body. This cap effectively closes the opening in the end of the piston pin making it unusable for oil pressure relief or as a space for oil to flow when necessary.

With reference to FIG. 5, an alternate embodiment of the present invention utilizes the center cavity of piston pin 48 as an additional means for reducing undesirable oil pressure at the piston rings. In an exemplary embodiment, additional space is created by replacing the cap that is normally used on the piston pin with a clip that is used to secure the piston body to the piston pin. As shown in FIG. 5, piston body 10 is attached to connecting rod 50 by piston pin 48 which is situated in piston pin aperture 44 (see FIG. 1). Connecting rod 50 is connected to crankshaft 52. Piston pin bore 46 passes through piston pin 48 and provides an additional drainage path for returning lubricating oil 55 to crankcase 54.

Figure 6:
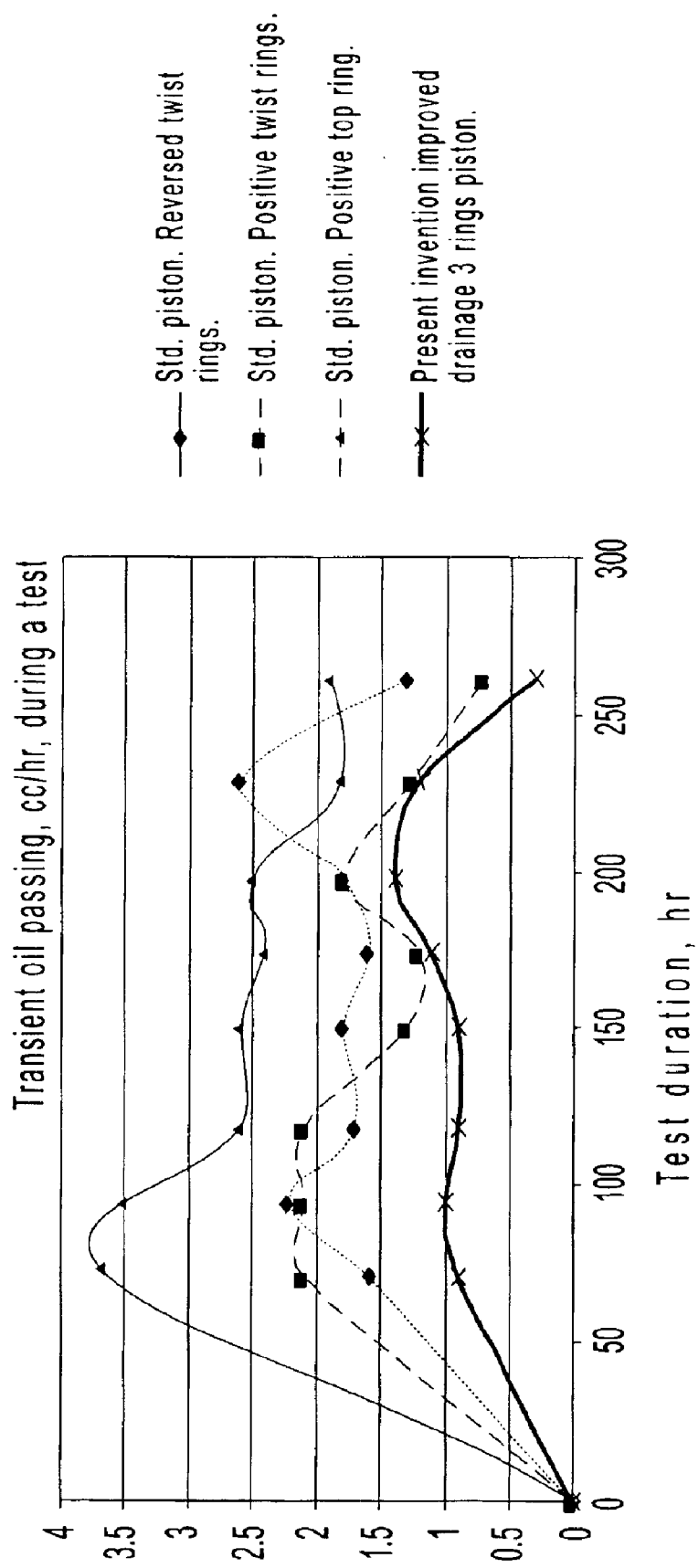
FIG. 6 is data plot showing the oil passing characteristic of standard pistons as compared to the contoured piston of FIG. 1.

Pistons designed in accordance with the teachings of the present invention have demonstrated reduced oil consumption compared to pistons that do not include oil pressure reducing features. FIG. 6 provides a data plot showing standard pistons compared to the piston of the present invention. As shown in FIG. 6, three different standard pistons were compared to the piston of the present invention in terms of transient oil passing (cc/hr). As is evident from the data presented, the present invention provided significantly reduced transient oil passing as compared to standard pistons utilizing different types of piston rings and ring combinations. While the contoured design of the piston body greatly reduces oil passing, increasing the tension of the oil control ring may further reduce oil passing. Thus, in an alternate embodiment of the present invention, the piston rings used in combination with the piston include at least one oil control ring in which the tangential tension of the has been increased by about 15% of that of standard oil control rings.

Another embodiment of the piston of the present invention provides a piston pin aperture that is offset from the vertical center of the piston body. Offsetting the piston pin aperture in this manner reduces the tendency of the piston move in a rocking, side to side manner by causing the piston to move in a planar manner. The benefits of this embodiment include improved sealing of the piston rings, reduction of friction drag, and reduction of piston noise.

Although the piston of the present invention may be manufactured from a variety of metals or metal alloys, a grade of aluminum that is susceptible to hard anodizing is preferred. The techniques and methods used in fabricating and manufacturing the piston are common, widely used, and will be familiar to those skilled in the art While the above description contains many specificities, these should not be construed as limitations on the scope of the invention, but rather as exemplification of preferred embodiments. Numerous other variations of the present invention are possible, and is not intended herein to mention all of the possible equivalent forms or ramifications of this invention. Various changes may be made to the present invention without departing from the scope of the invention.

What is claimed is:

1. A piston for use in an engine or a compressor, comprising:
   (a) a piston crown, wherein the piston crown further comprises a plurality of grooves encircling the crown, and wherein at least one of the grooves further comprises a first plurality of bores, and wherein the bores pass completely through the body of the piston;
   (b) a piston skirt beneath the piston crown, wherein the piston skirt further comprises a plurality of vertical drainage furrows formed in a portion of the piston skirt;
   (c) at least one channel recessed into the piston body between the topmost portion of the piston skirt and the bottom-most of the grooves and running parallel to the bottom-most groove; and
   (d) a second plurality of bores passing completely through the body of the piston, wherein each of the second plurality of bores passes through a portion of the recessed channel and the portion of the skirt immediately adjacent to the recessed channel.

2. The piston of claim 1, wherein the piston skirt further comprises at least one horizontal groove formed in the surface of the piston skirt between the vertical drainage furrows.

3. The piston of claim 1, wherein the piston crown further comprises a plurality of lands between the grooves, and wherein the bottom-most of the lands further comprises a plurality of drainage notches positioned above the vertical drainage furrows.

4. The piston of claim 1, further comprising:
   (a) at least two piston pin apertures formed opposite one another in the body of the piston; and
   (b) a piston pin mounted in each of the piston pin apertures, wherein each piston pin further comprises a bore for draining oil through the bore.

5. The piston of claim 4, wherein the piston pin apertures are offset from the vertical center of the piston.

6. A piston for use in a compressor or engine that utilizes lubricating oil, comprising:
   (a) a piston crown, wherein the piston crown further comprises a plurality of grooves encircling the crown for accommodating a plurality of piston rings, and wherein the plurality of grooves further comprises a topmost groove and a bottom-most groove;
   (b) a piston skirt beneath the piston crown;
   (c) means for diverting lubricating oil that has accumulated on the piston in or around the grooves out of or away from the grooves, wherein the diverting means further comprises:
      (i) a first plurality of bores formed in at least one of the grooves and passing completely though the body of the piston;
      (ii) a channel recessed into the piston body between the topmost portion of the piston skirt and the bottom-most groove and running parallel to the bottom-most groove; and
      (iii) a second plurality of bores passing completely through the body of the piston, wherein each of the bores passes through a portion the recessed channel and the portion of the skirt immediately adjacent to the recessed channel; and
   (d) means for diverting oil that has accumulated on the piston in or around the piston skirt away from the skirt, wherein the diverting means further comprises a plurality of vertical drainage furrows formed in a portion of the piston skirt.

7. The piston of claim 6, wherein the means for diverting oil that has accumulated on the piston in or around the piston skirt away from the skirt further comprises at least one horizontal groove formed in the surface of the piston skirt between the vertical drainage furrows.

8. The piston of claim 6, wherein the piston crown further comprises a plurality of lands between the grooves, and wherein the means for diverting lubricating oil that has accumulated on the piston in or around the grooves out of or away from the grooves further comprises a plurality of drainage notches formed in the bottom-most of the lands and positioned above said vertical drainage furrows.

9. The piston of claim 6, further comprising:
   (a) at least two piston pin apertures formed opposite one another in the body of the piston; and
   (b) a piston pin mounted in each of the piston pin apertures, and wherein each piston pin further comprises a bore for draining oil through the bore.

10. The piston of claim 9, wherein the piston pin apertures are offset from the vertical center of the piston.

* * * * *